United States Patent Office 3,689,295
Patented Sept. 5, 1972

3,689,295
QUICK-SETTING PORTLAND CEMENT
Arthur Theodore Hersey and James Richard Tonry, Easton, Pa., assignors to Alpha Portland Cement Company, Easton, Pa.
No Drawing. Continuation-in-part of application Ser. No. 843,195, July 18, 1969. This application May 26, 1971, Ser. No. 147,220
Int. Cl. C04b 13/26
U.S. Cl. 106—90
23 Claims

ABSTRACT OF THE DISCLOSURE

A portland cement composition is described which is capable of setting in a short period of time. The cement composition contains an additive composed of an ethanolamine and an acetate, acetic acid or acetic anhydride in amounts by weight between about 0.1% and 0.4%. The cement composition includes sulfur combined as $SO_3$ in controlled amounts between about 1% and 2.5% and has a Blaine fineness of at least about 4,000 square centimeters per gram. Concrete formed from this cement composition will develop a compressive strength of at least about 125 p.s.i. within about two hours in mortar tests.

Cross reference to related application.

This is a continuation-in-part application of Ser. No. 843,195 filed July 18, 1969 for Quick Setting Portland Cement, now abandoned.

Background of the invention

This invention relates to portland cement and, more particularly, to a portland cement composition which will set in a short period of time.

Portland cement is a powdered material which when mixed with water forms a paste that hardens slowly and will bond crushed rock, gravel and sand intermixed therewith into concrete. Standard high early strength portland cement compositions develop strength very slowly and will on the average take about 6 hours to develop about 125 p.s.i. compressive test strength. The time over which cement is permitted to set results in a steady increase in strength over a considerable period. Thus, standard procedures for testing cement strength properties include tests conducted after setting periods of 1, 7 and 28 days. However, strength improvements in concrete continue for a number of years.

If a portland cement clinker is ground without the addition of a retarder (e.g. gypsum) its interaction with water is usually rapid causing a sharp increase in temperature and a flash set. This is due to the rapid hydration of tricalcium aluminate accompanied by crystallization of the calcium aluminate hydrates that congeal the paste. When gypsum is added as a retarder, it reacts rapidly with the dissolved aluminate in the presence of calcium hydroxide to form calcium sulfoaluminate. When no retarder is included in the cement composition, the flash set which does result is not acceptable to produce a quick setting cement because set is so rapid as to prevent removal from the mixer and is not amenable to handling or finishing. Although calcium chloride when interground with portland cement will cause quick setting to occur, a problem arises due to corrosion with steel since the concrete is conductive and sets up an electrical potential when different metals (e.g. steel and aluminum) are embedded in the resulting concrete.

Although attempts have been made to overcome the foregoing and other difficulties in the development of a practical quick setting cement, none was entirely satisfactory in every respect when carried into practice commercially.

Brief summary of the invention

A portland cement composition has now been developed which will set over a short period of time and will develop sufficient strength within this period to make it practical in many applications calling for a cement which hardens in a minimum of time.

An object of this invention therefore is to provide a portland cement composition which will set in a minimum period of time.

Another object of this invention is to provide a portland cement composition which will set in a minimum period of time and will develop a compressive strength which is only obtainable in standard grade portland cements after considerably longer periods.

Description of the invention

In accordance with this invention, a portland cement composition having incorporated therewith a minimum of about 0.1% (by weight of the cement) an additive composed of ethanolamine and acetic acid, acetic anhydride or an acetate will have quick setting properties. This additive reduces the setting time, as determined by ASTM C-266 test method, and develops quick setting properties in the cement rendering it suitable for use in a wide variety of applications.

Preferred embodiments of the invention

In carrying the invention into practice, the additive should be present in the cement composition in amounts between about 0.10% and 0.40%. Advantageously, the additive is present in amounts between about 0.15% and 0.2%. To be commercially practical, the cement composition should be capable of developing a compressive strength of at least about 125 pounds per square inch (p.s.i.) measured in accordance with a modified ASTM C-109 test method using a 1 cement to 1¼ aggregate mix with 17% by weight water, within about two hours. To develop this strength in such a short period of time the cement composition has interground therewith about 1% to 2.5% sulfur (by weight of the cement) combined as $SO_3$. The sulfur can be supplied in these amounts by including gypsum in the cement in amounts of about 1.2% to 6%.

To consistently develop a compressive strength of 125 p.s.i. within two hours over a wide range of portland cement compositions, the additive and $SO_3$ proportions should preferably be present in balanced amounts. In this regard, when the $SO_3$ content exceeds about 1.5%, the additive should be present in the composition in amounts of at least about 0.185%. Advantageous results are achieved when the amount of additive is increased in the cement composition in roughly proportional relationship to the increase in $SO_3$ content. If the additive is present in the cement composition in amounts below about 0.1% or above about 0.4% the quick setting properties of concrete formed from this cement are greatly retarded. If the sulfur combined as $SO_3$ is not present in the cement composition in amounts of at least about 1%, the strength of the concrete formed from this cement is below the 125 p.s.i. practical lower limit necessary to render the cement commercially feasible as a quick setting cement. Sulfur contents above about 2.5% may seriously retard the quick setting properties of the cement. To further control the rate at which the cement sets, hydroxylated acid type D retarders meeting ASTM C–494–68 standard can be employed.

To further facilitate the development of this minimum strength in such a short period of time the Blaine fineness should be at least about 4,000 square centimeters per gram. The Blaine fineness can range up to about 6,500 square centimeters per gram when conventional grinding equipment is employed. A Blaine fineness above 6,500 square centimeters per gram will not however detrimentally affect the strength and quick setting properties of the cement.

The rate of development of strength in cement paste is determined chiefly by the tricalcium silicate ($C_3S$) content and the fineness of the cement. Advantageously, therefore, quick setting portland cement compositions should normally include tricalcium silicate ($C_3S$) in amounts between about 50% and 70% (by weight) and tricalcium aluminate ($C_3A$) in amounts between about 8% and 15% (by weight).

The ethanolamine content of the additive can vary between about 45% and 70% (by weight) with the balance essentially acetic acid, acetic anhydride or an acetate, such as calcium acetate, which is believed to be a product of the chemical reaction between these ingredients and portland cement, and, therefore may be added directly as a component with triethanolamine. For example, we have found that acetates, such as acetates of calcium, ammonium, potassium, sodium, barium, lead, uranium or zinc perform satisfactorily. An additive composition of about 69% by weight triethanolamine and about 31% by weight acetic acid is particularly advantageous. Satisfactory results are achieved when the amine is present as combinations of mono-, di- and triethanolamine.

To give those skilled in the art a better understanding of the invention, the following illustrative examples are given:

EXAMPLE 1

A clinker is prepared with the following composition in weight percent.

| | |
|---|---|
| Silica ($SiO_2$) | 22.76 |
| Alumina ($Al_2O_3$) | 5.08 |
| Iron oxide ($Fe_2O_3$) | 2.28 |
| Lime (CaO) | 65.71 |
| Magnesia (MgO) | 3.42 |
| Sulfur ($SO_3$) | 0.56 |
| Loss | 0.14 |

To 5.80 pounds of clinker is added 0.20 pound of terra alba. To this mixture is added 8.7 cubic centimeters (cc.) of an undiluted additive containing by weight 69% triethanolamine and 31% acetic acid. The clinker-terra alba mixture and additive are ground for about 2½ hours using standard laboratory model ball mill 12 inches long by 12 inches in diameter. The resulting portland cement composition has a sulfur content combined as $SO_3$ of 2.10%, a Blaine fineness of 5,486 square centimeters per gram (cm.²/gram) and the following analysis as calculated potential composition (ASTM C–150) in weight percent:

| | Percent |
|---|---|
| Tricalcium silicate ($C_3S$) | 53.1 |
| Dicalcium silicate ($C_2S$) | 22.7 |
| Tricalcium aluminate ($C_3A$) | 9.3 |
| Tetracalcium aluminoferrite ($C_4AF$) | 6.7 |
| Additive | 0.4 |
| (Balance) | 7.8 |

The portland cement composition is mixed with aggregate in amounts of 1 cement to 1¼ aggregate in sand size. Water is then added in amounts of 17% by weight to form a mortar of plastic consistency. A 2-inch mortar cube is formed from the paste and permitted to set for one hour. A compressive strength test is then performed on the two inch mortar cube in accordance with ASTM C–109 test method and found to be 358 p.s.i.

As can be seen by the test results presented in Example 1, the quick setting cement is able to develop well over the practical minimum of 125 p.s.i. within two hours. The compressive strength of the cement composition disclosed in Example 1 continued to increase so that it was 2,250 p.s.i. after one day, 3,500 p.s.i. after 3 days, 4,850 p.s.i. after 7 days, 5,800 p.s.i. after 28 days and 6,500 p.s.i. after 90 days. It is obvious therefore that the properties of this cement correspond approximately after 1, 3, 7, 28 and 90 day periods in strength properties to those of standard type 1 portland cement. The ability of the cement in accordance with this invention to set rapidly and develop strength in a minimum amount of time makes it particularly adaptable for use in patching concrete highways, roads, public thoroughfares, and sidewalks. Other uses for this quick setting cement include insulating roof deck applications, foam concrete and small precast concrete members.

The table below presents Examples 2 to 14 to further illustrate the invention. Examples 2 to 14 are prepared in the same manner and have cement compositions substantially corresponding to that of Example 1 with the exceptions of the amount of additive, $SO_3$ content and Blaine fineness. The table lists the amount of additive, $SO_3$ content and Blaine fineness for each of Examples 1 to 14. The additive composition for Examples 2, 7, 8, 9, 10 and A is the same as Example 1. The additive composition of Examples 3, 4, 5, 6, 12 and B consists of a mixture of triethanolamine and acetic acid obtained commercially from W. R. Grace & Company, Cambridge, Mass., under the trademark $HEA_2$ while that of Example 11 is an additive similar to $HEA_2$ but obtained commercially from West Virginia Pulp and Paper Company under the trademark REAX 77. The concentration of the additive is listed in the table with the balance water where the additive concentration is less than 100%.

As discussed above, a typical formulation of an additive composition for incorporating with a portland cement may be between 45 and 70% triethanolamine and the remainder acetic acid or acetic anhydride. A specific example of such an additive composition may be as follows:

| | Grams |
|---|---|
| Triethanolamine | 100 |
| Acetic acid | 45 |

Also, as discussed above, the acetic acid or acetic anhydride portion of the additive composition may be substituted on an equivalent weight basis, for a suitable metallic acetate or ammonium acetate. It has been found that typical examples of acetates as listed above with a dilution of water added to 70% based on the active compounds, i.e. triethanolamine and acetic acid or acetic anhydride are useful compositions for quick setting portland cement. The anhydride or acetic acid portion may be substituted for a suitable acetate on an equivalent weight basis and allowance made for the combined elements. Thus, where triethanolamine at 100 grams is employed an equivalent weight of acetic acid of 45 grams may be replaced or substituted by a suitable acetate such as:

| | Grams |
|---|---|
| Ammonium acetate | 58 |
| Barium acetate | 96 |
| Calcium acetate | 66 |
| Potassium acetate | 96 |
| Sodium acetate | 62 |

These acetates together with uranyl acetate were used in portland cement compositions for making quick setting cement, the results of which are set forth in Table 2 herein.

TABLE 1.—FORMULATION OF TRIETHANOLAMINE AND ACETIC ACID

| Example: | Additive concentration (weight percent) | Amount of additive interground with cement (cc.) | Additive, percent | Sulfur as SO₃ (percent) | Blaine fineness (cm.²/gm.) | Mortar testing time (hours) | Compressive strength (p.s.i.) |
|---|---|---|---|---|---|---|---|
| 2 | 49 | 15 | 0.30 | 1.93 | 4,953 | 1 | 318 |
| 3 | 70 | 4 | 0.122 | 1.44 | 5,158 | 1.25 | 192 |
| 4 | 70 | 5 | 0.153 | 1.43 | 5,240 | 1 | 245 |
| 5 | 70 | 7 | 0.214 | 1.47 | 5,360 | 1 | 265 |
| 6 | 70 | 6 | 0.184 | 1.44 | 5,207 | 1 | 252 |
| 7 | 85 | 6 | 0.15 | 2.08 | 4,819 | 1 | 315 |
| 8 | 70 | 6 | 0.185 | 2.20 | 5,407 | 2 | 270 |
| 9 | 70 | 6 | 0.185 | 2.08 | 5,487 | 1 | 235 |
| 10 | 70 | 6 | 0.185 | 1.82 | 5,370 | 1 | 260 |
| 11 | 100 | 6 | 0.185 | 1.50 | 5,332 | 1 | 200 |
| 12 | 100 | 6 | 0.185 | 1.53 | 5,283 | 1 | 185 |
| 13 | 100 | 8.7 | 0.38 | 2.10 | 5,486 | 1 | 358 |
| 14 | 70 | 8.7 | 0.27 | 2.35 | 5,779 | 1 | 305 |
| A | 85 | 15 | 0.55 | 2.73 | 5,163 | 5 | 80 |
| B | 70 | 6 | 0.184 | 2.85 | 5,082 | 5 | 115 |

TABLE 2.—FORMULATIONS OF TRIETHANOLAMINE AND CERTAIN ACETATES

| Example and acetate used: | Additive concentration (weight percent) | Amount of additive interground with cement (cc.) | Additive (percent) | Sulfur as SO₃ (percent) | Blaine fineness cm.²/gm. | Mortar testing time (hours) | Compressive strength (p.s.i.) |
|---|---|---|---|---|---|---|---|
| 15 Calcium acetate | 70 | 8.7 | 0.27 | 1.91 | 5,332 | 1 | 370 |
| 16 Ammonium acetate | 70 | 8.7 | 0.27 | 1.91 | 5,576 | 1 | 345 |
| 17 Lead acetate | 70 | 8.7 | 0.27 | 1.93 | 5,364 | 1 | 410 |
| 18 Uranyl acetate | 70 | 8.7 | 0.27 | 1.94 | 5,442 | 1 | 360 |
| 19 Sodium acetate | 70 | 6.0 | 0.17 | 2.02 | 5,320 | 1 | 400 |
| 20 Potassium acetate | 70 | 6.0 | 0.17 | 1.98 | 5,364 | 1 | 375 |
| 21 Zinc acetate | 70 | 6.0 | 0.17 | 1.98 | 5,381 | 1 | 395 |
| 22 Barium acetate | 70 | 6.0 | 0.17 | 1.98 | 5,397 | 1 | 365 |

As can be seen by the examples in Table 1, the compressive strengths of Examples 2, 4, 5, 6, 7 and 9 to 12 are developed in less than one hour and are well over the 125 p.s.i. practical minimum. Example 3 illustrates a cement composition in which the additive is present in amounts just above the minimum with an SO₃ content of 1.44% resulting in a compressive strength as high as 192 p.s.i. in a little over one hour. Example 8 is a typical cement composition which is suitable for use in highway patching which usually requires a cement to harden in 1½ to 2 hours. Example 13 illustrates a portland cement composition in which the sulfur content, calculated as SO₃, is slightly in excess of 2% by weight and the additive composition of triethanolamine and acetic acid present at 0.38% developed a compressive strength of 358 p.s.i. in 1 hour. Example 14 illustrates a portland cement composition in which the amount of additive composition was reduced to 0.27% with the amount of sulfur as SO₃ increased to 2.35% developed a compressive strength after 1 hour of 350 p.s.i.

In Table 2, the various acetates which have been employed and perform quite well as additive compositions of triethanolamine are set forth as specific examples of quick setting cement compositions defined in Examples 15 through 22. It shoud be noted from Table 2 that where the concentration of additive on a percent weight basis remains constant but where sulfur as the SO₃ content is varied slightly between approximately 1.9% to 2.0%, the compressive strength developed after 1 hour ranges from about 350 to 410 lbs. per square inch. This is a considerably higher range of compressive strength when compared to the compressive strength developed using the formulation triethanolamine and acetic acid or acetic anhydride. From the foregoing, it is obvious that metallic acetates and ammonium acetate as indicated above may be employed as an additive composition for producing quick setting cement which develops a high compressive strength greater than 125 p.s.i. within about 2 hours.

Examples A and B shown in Table 1 are beyond the scope of the invention and are included merely for comparative purposes with Examples 1 to 12. Example A is beyond the scope of the invention because the additive and sulfur as SO₃ are present in amounts above the upper limits of the invention. In this regard, it should be noted that after 5 hours of setting, the cement composition shown in Example A develops a compressive strength of only 80 p.s.i. Example B illustrates the effect of excess amounts of sulfur as SO₃ when the additive is present in amounts contemplated by the invention. As can be seen from the data in Table 1, after 5 hours of setting time the cement of Example B is only capable of developing a compressive strength of 115 p.s.i.

This invention is not to be confused with that disclosed in U.S. Pat. No. 3,329,517. In this patent a cement additive is disclosed which consists of an alkanolamine acetate or acetylated alkanolamine acetate. The additive is mixed with portland cement in amounts between 0.005% and 0.050% (based on the weight of the cement) for use as a grinding aid. In these amounts, the alkanolamine acetate serves to facilitate grinding of the cement to produce a desired range of particle size. As can be seen from the following Example C an ethanolamine type additive in amounts of 0.050% or less is insufficient to produce a quick setting cement as defined by the present invention.

EXAMPLE C

A cement composition is prepared and processed as shown in Example 1 using the additive disclosed in Example 2. The additive is included in the cement composition in the amount of 0.050% by weight of the cement. A 2-inch mortar cube is prepared from cement paste in the manner disclosed in Example 1. After one hour of setting time the cube is too soft and cannot be stripped. After about 6 hours the cube is sufficiently hard to be stripped. A second 2-inch mortar cube is prepared from the cement paste and allowed to set for 5½ hours to permit stripping and is then tested in accordance with ASTM C–109 and found to have a compressive strength of 125 p.s.i.

The small amount of additive contained in the cement composition renders Example C beyond the scope of the invention because the additive is not present in amounts of at least about 0.1%. It is readily apparent from the test results of Example C that the inclusion of the additive in amounts of only 0.050% does not produce a quick setting cement. Moreover, as is clear from the data shown in Example C, after two hours the cement does not set and does not develop a practical or working compressive strength of at least 125 p.s.i. In addition, it is necessary to allow the cement to set for 5½ hours before a strength of 125 p.s.i. is developed. Such a cement cannot be considered by any standard a quick setting cement and is included here merely for comparative purposes with Examples 1 to 12. The properties developed in Example C are similar in many respects to a high early type III cement and do not approach the properties of the quick setting cement defined in accordance with this invention.

Although the present invention has been described in conjunction with preferred embodiments, it is to be understood that modifications and variations may be resorted to without departing from the spirit and scope of the invention as those skilled in the art will readily understand.

We claim:

1. A portland cement composition which consists essentially of by weight about 1.0% to 2.5% sulfur combined as $SO_3$ and about 0.1% to 0.4% of an additive consisting of about 45–70% by weight of an ethanolamine and the balance being at least one material selected from the group consisting of acetic acid, acetic anhydride, a metallic acetate and ammonium acetate; said cement composition having a Blaine fineness of at least about 4,000 square centimeters per gram and being characterized by quick setting properties wherein concrete formed from this cement will develop a compressive strength of at least about 125 pounds per square inch within about two hours.

2. A portland cement composition in accordance with claim 1 wherein the cement includes about 50% to 70% tricalcium silicate.

3. A portland cement composition in accordance with claim 2 wherein the cement includes about 8% to 15% tricalcium aluminate.

4. A portland cement composition in accordance with claim 1 wherein the $SO_3$ is present in amounts of at least about 1.4% and the additive is present in amounts of at least about 0.12%.

5. A portland cement composition in accordance with claim 1 wherein the additive includes 50% to 70% by weight triethanolamine.

6. A portland cement composition in accordance with claim 5 wherein the additive by weight consists essentially of about 69% triethanolamine and about 31% acetic acid.

7. A portland cement composition in accordance with claim 1 wherein the $SO_3$ is supplied by gypsum incorporated in the cement composition in amounts between about 1.2% and 6%.

8. A portland cement composition in accordance with claim 1 wherein the Blaine fineness is between about 4,000 and 6,500 square centimeters per gram.

9. A portland cement composition in accordance with claim 1 wherein said metallic acetate is selected from the group consisting of calcium acetate, lead acetate, uranyl acetate, sodium acetate, potassium acetate, zinc acetate and barium acetate.

10. A portland cement composition which consists essentially of by weight about 1.0% to 2.5% sulfur combined as $SO_3$ and about 0.1% to 0.4% of an additive consisting of about 45–70% by weight of an ethanolamine and the balance being at least one material selected from the group consisting of acetic acid, acetic anhydride, a metallic acetate and ammonium acetate provided that when the $SO_3$ content is about 1.4% or more the additive is present in amounts of at least about 0.12%; said cement composition having a Blaine fineness of at least about 4,000 square centimeters per gram and being characterized by quick setting properties wherein concrete formed from this cement will develop a compressive strength of at least about 125 pounds per square inch within about two hours.

11. A portland cement composition in accordance with claim 10 wherein the cement includes about 50% to 70% tricalcium silicate.

12. A portland cement composition in accordance with claim 11 wherein the cement includes about 8% to 15% tricalcium aluminate.

13. A portland cement composition in accordance with claim 10 wherein the $SO_3$ is present in amounts of at least about 1.5% and the additive is present in amounts of at least about 0.185%.

14. A portland cement composition in accordance with claim 10 wherein the additive includes 50% to 70% by weight ethanolamine.

15. A portland cement composition in accordance with claim 10 wherein said metallic acetate is selected from the group consisting of calcium acetate, lead acetate, uranyl acetate, sodium acetate, potassium acetate, zinc acetate and barium acetate.

16. A portland cement composition in accordance with claim 14 wherein the additive by weight consists essentially of about 69% triethanolamine and about 31% acetic acid.

17. A portland cement composition in accordance with claim 10 wherein the $SO_3$ is supplied by gypsum incorporated in the cement composition in amounts between about 1.2% and 6%.

18. A process of reducing the setting time of portland cement which comprises intergrinding with the cement in amounts of at least about 0.1% by weight the additive as described in claim 1.

19. A prcess in accrdance with claim 18 wherein the additive consists essentially of about 69% triethanolamine and about 31% acetic acid.

20. A prcess in accordance with claim 18 wherein the additive is interground in amounts between about 0.1% and 0.4%, the cement includes about 1.0% to 2.5% by weight sulfur combined as $SO_3$, and the cement has a Blaine fineness between about 4,000 and 6,500 square centimeters per gram, whereby concrete formed from this cement will develop a compressive strength of at least about 125 pounds per square inch within about two hours.

21. A process in accordance with claim 20 wherein the cement includes about 50% to 70% tricalcium silicate.

22. A process in accordance with claim 21 wherein the cement includes about 8% to 15% tricalcium aluminate.

23. A process in accordance with claim 18 wherein the metallic acetate is selected from the group consisting of calcium acetate, lead acetate, uranyl acetate, sodium acetate, potassium acetate, zinc acetate and barium acetate.

References Cited
UNITED STATES PATENTS

| | | | |
|---|---|---|---|
| 3,329,517 | 7/1967 | Dodson et al. | 106—315 |
| 3,094,425 | 6/1963 | Adams et al. | 106—315 |
| 3,093,499 | 6/1963 | Blackwood et al. | 106—90 |
| 2,857,286 | 10/1958 | Striker | 106—90 |

JAMES E. POER, Primary Examiner
W. T. SCOTT, Assistant Examiner

U.S. Cl. X.R.
106—102, 315